United States Patent
Marchildon et al.

(10) Patent No.: US 9,834,643 B2
(45) Date of Patent: *Dec. 5, 2017

(54) CONTINUOUS POLYAMIDATION PROCESS—II

(71) Applicant: INVISTA NORTH AMERICA S.A R.L., Wilmington, DE (US)

(72) Inventors: Ernest Keith Marchildon, Kingston (CA); Karen A. Surgenor, Kingston (CA); Bryan D. Kaushiva, West Yorkshire (GB)

(73) Assignee: INVISTA NORTH AMERICA S.A R.L., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/037,635

(22) PCT Filed: Nov. 20, 2014

(86) PCT No.: PCT/GB2014/053438
§ 371 (c)(1),
(2) Date: May 18, 2016

(87) PCT Pub. No.: WO2015/075458
PCT Pub. Date: May 28, 2015

(65) Prior Publication Data
US 2016/0289384 A1    Oct. 6, 2016

(30) Foreign Application Priority Data

Nov. 20, 2013    (GB) ................... 1320518.2

(51) Int. Cl.
| | |
|---|---|
| *C08G 69/28* | (2006.01) |
| *B01J 14/00* | (2006.01) |
| *B01J 10/00* | (2006.01) |
| *B01J 19/00* | (2006.01) |
| *B01J 19/18* | (2006.01) |
| *B01J 19/24* | (2006.01) |
| *B01J 4/00* | (2006.01) |

(52) U.S. Cl.
CPC .............. *C08G 69/28* (2013.01); *B01J 4/002* (2013.01); *B01J 10/002* (2013.01); *B01J 14/00* (2013.01); *B01J 19/0006* (2013.01); *B01J 19/006* (2013.01); *B01J 19/18* (2013.01); *B01J 19/245* (2013.01); *B01J 2219/002* (2013.01); *B01J 2219/00186* (2013.01); *B01J 2219/00202* (2013.01); *B01J 2219/00231* (2013.01)

(58) Field of Classification Search
CPC ........ C08G 63/80; C08G 69/28; C08G 69/00; C08G 69/265
See application file for complete search history.

(56) References Cited

U.S. PATENT DOCUMENTS

| | | | |
|---|---|---|---|
| 4,131,712 A | 12/1978 | Sprauer | |
| 4,433,146 A | 2/1984 | Beckers et al. | |
| 4,438,257 A | 3/1984 | Miyamoto et al. | |
| 5,674,974 A | 10/1997 | Brearley et al. | |
| 6,169,162 B1 * | 1/2001 | Bush ...................... | C08G 69/04 528/310 |
| 2002/0183478 A1 | 12/2002 | Fergusson et al. | |

FOREIGN PATENT DOCUMENTS

| | | |
|---|---|---|
| EP | 1611184 A1 | 1/2006 |
| GB | 1476821 A | 6/1977 |
| WO | 1996/016107 A1 | 5/1996 |
| WO | 2013/008574 A1 | 1/2013 |
| WO | 2015/075458 A1 | 5/2015 |

OTHER PUBLICATIONS

International Search Report and Written Opinion Received for PCT Application No. PCT/GB2014/053438, dated Feb. 10, 2015, 13 pages.
International Preliminary Report and Patentability Report Received for PCT Patent Application No. PCT/GB2014/053438, dated Jun. 2, 2016, 10 pages.

* cited by examiner

*Primary Examiner* — Gregory Listvoyb
(74) *Attorney, Agent, or Firm* — Robert B. Furr, Jr.; Nicholas P. Lanzatella (57) ABSTRACT

A continuous process for the manufacture of a polyamide, the process comprising the steps of: (i) flowing a stream A comprising a moltendicarboxylic acid, or a molten dicarboxylic acid-rich mixture comprising a dicarboxylic acid and a diamine, through a first stage and at least one more reaction stage of a vertical multistage reactor, wherein the first stage is at the top of the reactor; (ii) counter-currently flowing a stream B comprising a diamine as either a vapor or a diamine-rich liquid through at least one of the stages below the first reaction stage of said vertical multistage reactor; (iii) accumulating a liquid phase material P comprising polyamide at and/or below the final stage of said reactor; wherein said reactor is equipped with internal features suitable for effecting contact between counter-currently flowing streams A and B; and wherein the process further comprises controlling the viscosity of said liquid phase material P by directly controlling the chemical equilibrium of the polyamidation reaction or by controlling stream B so that the amounts of diamine and dicarboxylic acid introduced into the reactor during the process are stoichiometrically imbalanced. The invention further provides a vertical multistage reactor configured to implement said process.

21 Claims, 7 Drawing Sheets

CONTINUOUS POLYAMIDATION PROCESS—II

FIELD OF THE INVENTION

The present invention relates to methods for the production of polyamides, and apparatus in which the polymerisation process can be conducted. More particularly, the present invention relates to continuous processes for the production of high molecular weight polyamides by the reaction of a dicarboxylic acid with a diamine via counter-current flow in a vertical multistage reactor.

BACKGROUND OF THE INVENTION

Polyamides, such as nylon-6,6, require starting monomers of two kinds, a monomer having a pair of carboxylic acid functional reactive groups (diacid) and a monomer having a pair of amino functional reactive groups (diamine), and such polyamides are typically referred to as dimonomeric polyamides. The polyamide may further incorporate more than one diacid and more than one diamine and may incorporate a small amount, usually no more than 10%, of a third kind of starting material having a carboxylic acid functional group and an amino functional group or a functional precursor to such a compound.

In a conventional method of preparing such dimonomeric polyamides, the starting diacid and diamine components are mixed in stoichiometric proportions into an aqueous solution. The water is subsequently removed by evaporation, typically at elevated pressure in order to achieve a high enough boiling temperature to prevent the formation of solids. However, the post-evaporation pressure reduction step requires excessive heat to prevent the product from solidifying, and this heating is known to cause discoloration and chemical degradation of the product.

Alternative methods to produce polyamides comprise the supply of one or both components in liquid (molten) form. Typically, the polyamidation reactions are carried out in vertical multistage reactors, otherwise known as column reactors. The requisite diacid and diamine are flowed counter-currently through the reactor and the product polyamide collects at the lowest stages of the reactor, or column bottom. However, the high temperatures required to retain the component(s) in melt form can result in degradation, and a number of methods (see, for instance, U.S. Pat. No. 4,131,712, U.S. Pat. No. 4,433,146 and U.S. Pat. No. 4,438,257) have sought to reduce such degradation and overcome associated difficulties. U.S. Pat. No. 5,674,974 (incorporated by reference herein in its entirety) discloses the continuous production of polyamide in a vertical multistage reactor with counter-currently flowing dicarboxylic acid and diamine streams, which improved earlier processes by reducing energy consumption, reducing capital cost of equipment and reducing environmental emissions, as well as improving product quality. In vertical multistage reactors such as that disclosed in U.S. Pat. No. 5,674,974 the diacid feed stream typically consists of a mixture of diacid and diamine in which there is an excess of diacid. Such a diacid feed-stream does not require supra-atmospheric pressures in order to solvate in the moisture produced by the polyamidation reaction, and thus the reactors are operated at atmospheric pressure. Also, the flow of diamine fed into the reactor is typically controlled to maintain a stoichiometric balance of diacid and diamine.

In all such methods comprising the supply of component(s) in liquid (molten) form, it is a requirement that the molten material accumulating at the bottom of the reactor must be homogeneous and sufficiently mixed, in order for the reaction to proceed efficiently. Agitation is essential to column operation in order to homogenize the lower three stages and avoid gel build-up in stagnant zones, which can also cause degradation and the formation of coloured impurities. Gel build-up occurs because, without direct means for controlling the chemical equilibria in the melt, the temperature rises due to the heat emitted by the polyamidation reaction which in turn causes evaporation of water produced by the polyamidation reaction thus causing a rise in viscosity and gel build-up. For example, as the temperature reaches ca. 250° C. mid-way down the column reactor the moisture in the liquid melt falls below ca. 0.5 wt % and approaches 0.2 wt %. The melt is thus starved of moisture, thereby promoting viscosity rise. All such conventional processes therefore require mechanical agitation in order to attain sufficient mixing. However, there are several disadvantages associated with the use of mechanical agitation, including reactor complexity and complexity in process scale-up. Agitators used in vertical multistage polyamidation reactors are complicated and expensive to design and manufacture as they require adequate mechanical strength to sufficiently agitate molten polyamide, but minimal surface area and roughness in order to limit the extent to which their surface provides nuclei for gelation. Larger reactors require commensurately larger mechanical agitators. However, as the size of the agitator is increased to cope with the increased size of the reactor, it becomes increasingly difficult to transmit the torque generated by the agitator across the diameter of the column. Moreover, as the size of the mechanical agitator increases, its mechanical strength must also increase, which leads to difficulties in the design, fabrication and reliability of the component, as well as increased capital expenditure. The effective limit on the size of the mechanical agitator in turn limits the size of the polyamidation reactor, and hence the production output. In addition, processes and apparatus using conventional mechanical agitation are sensitive to perturbations of material in the reactor, and can suffer from poor reliability.

It is an objection of the present invention to overcome one or more of these problems.

As used herein, the term "counter-currently flowing" has the meaning conventional in the art, namely the direction of the current of one flow stream is opposite to the direction current of another flow stream in the reactor.

As used herein, the term "salt" is used in a general sense to encompass the precursors to polyamidation whether in a fully ionized state, an oligomeric state, or in any combination thereof.

As used herein, the term "weir" has its meaning conventional in the art, namely a barrier which impedes the flow of liquid phase reaction fluid. The weir causes liquid phase reaction fluid to pool behind it, while allowing liquid phase reaction fluid to flow steadily over the top of it once a sufficient volume of reaction fluid has built up behind it. Thus, a weir preferably comprises a surface which is perpendicular or substantially perpendicular to the direction of flow of the liquid phase reaction fluid at the point of contact of the weir with the reaction fluid, although any appropriate angle greater than 0° (preferably at least 30°, preferably at least 60°, preferably at least 85°) to the direction of flow of the reaction fluid may be used.

SUMMARY OF THE INVENTION

According to the present invention, there is provided a continuous process for the manufacture of a polyamide, the process comprising the steps of:
(i) flowing a stream A comprising a molten dicarboxylic acid, or a molten dicarboxylic acid-rich mixture comprising a dicarboxylic acid and a diamine, through a first stage and at least one more reaction stage of a vertical multistage reactor, wherein the first stage is at the top of the reactor;

(ii) counter-currently flowing a stream B comprising a diamine as either a vapour or a diamine-rich liquid through at least one of the stages below the first reaction stage of said vertical multistage reactor;

(iii) accumulating a liquid phase material P comprising polyamide at and/or below the final stage of the reactor (i.e. the stage furthest below said first stage of said reactor);

wherein said reactor is equipped with internal features suitable for effecting contact between counter-currently flowing streams A and B;

wherein the viscosity of said liquid phase material P is controlled by directly controlling the chemical equilibrium of the polyamidation reaction in the reactor or by controlling stream B so that the amounts of diamine and dicarboxylic acid introduced into the reactor during the process are stoichiometrically imbalanced.

According to a further aspect of the present invention, there is provided a vertical multistage reactor, or column reactor, suitable for implementing the process of the invention, wherein the reactor comprises:

(i) a first stage;

(ii) at least one stage below the first stage;

(iii) internal features suitable for effecting contact between counter-currently flowing streams of a first stream A introduced through the first stage and a second stream B introduced through at least one of the stages below the first reaction stage; and (iv) a chamber configured to allow a gaseous stream C or D to be injected from the chamber into the reactor at or below the final stage of the reactor.

The process reduces or eliminates the requirement for direct mechanical agitation in the lowest stages of the reactor, compared to processes known in the art, by enabling the operator to control the rate of viscosity build-up in the reactor.

In a first embodiment, viscosity is controlled by injecting steam into the material P.

In a second embodiment, viscosity is controlled by maintaining the pressure of the reactor at a pressure greater than atmospheric pressure.

In a third embodiment, viscosity is controlled by controlling the stream B so that the amounts of diamine and dicarboxylic acid introduced into the reactor during the process are stoichiometrically imbalanced.

The first, second and third embodiments described hereinabove, may be used separately from each other, or they may be used in combination. Thus, the viscosity of the liquid phase material P is controlled by means of either the first or second or third embodiments. Alternatively, the viscosity is controlled by the first embodiment in combination with either the second or third embodiments. Alternatively, viscosity is controlled by the second embodiment in combination with the third embodiment, optionally in combination with the first embodiment.

The invention provides a number of benefits, including simplified reactor designs, ease of process scale-up and design, increased reactor size and output, improved reactor balance, reductions in sensitivity to perturbations in material in the reactor, increased reliability, reduced energy requirements, lower capital expenditure of equipment and improved heat transfer in the reactor.

The present invention may be used in a reactor entirely without mechanical agitation, or it may be used in conjunction with mechanical agitation. One of the key advantages of the invention is that the size and output of the column reactor is no longer dependent on the size of the mechanical agitator. Furthermore, there is no longer a need to operate at the limits of the mechanical strength of the agitator in order to increase reactor size and output.

The present invention allows the production of polyamide with low amounts of impurities and/or colorants more efficiently and more economically

DETAILED DESCRIPTION OF THE INVENTION

The process of the present invention is carried out in a vertical multistage reactor, known in the art as a column reactor. The vertical multistage reactor may have up to 10 or more stages, typically 6 to 10 stages. The first stage is at the top of the reactor (column top), and the reactor has one or more additional stages below the first stage, the final stage (i.e. the stage which is furthest from the first stage) being at the bottom of the reactor (column bottom).

In the process of the present invention, molten diacid may be fed into the reactor or a molten acid-rich mixture of diacid and diamine may be fed into the reactor. A suitable acid-rich mixture is about 75% to about 85% by weight diacid relative to the total amount of diacid and diamine in the mixture and about 15% to about 25% by weight diamine relative to the total amount of diacid and diamine in the mixture. Such a process is particularly applicable to the manufacture of nylon-6.6 (poly(hexamethylene adipamide)) where the starting materials comprise adipic acid and hexamethylene diamine.

The composition of stream A introduced into the reactor may comprise dicarboxylic acid alone, and such a process is suitable for a diacid that does not suffer excess degradation at a temperature around its melting point. Alternatively, an acid-rich mixture is introduced into the reactor, in which case dicarboxylic acid is combined with diamine to produce an acid-rich mixture, which may be achieved continuously or batch-wise, suitably such that a steady flow to the first stage of the reactor is maintained. Molten dicarboxylic acid-rich mixtures comprising dicarboxylic acid and diamine may be prepared by melting compositions (for example, particles, pellets, pastilles or flakes) having the desired mixture, such as those prepared in WO-2013/08574-A, which is incorporated by reference in its entirety.

Preferably, diacid is combined with diamine into an acid-rich feed stream to provide a feed in which the diacid remains chemically stable, particularly where nylon 6,6, is the product and adipic acid is the dicarboxylic acid. This may be done continuously or batch-wise, suitably wherein a steady feed stream to the first stage of the reactor is maintained. One method is provided in U.S. Pat. No. 4,131,712, col. 2, lines 30-39, which is incorporated herein by reference. A preferred method is to carry out that process continuously by combining feed streams of solid, granular adipic acid and hexamethylene diamine or hexamethylene diamine solution (which is commercially used at 85-100% purity, balanced with water) at approximately 120° C. to 135° C. with agitation, suitably wherein the molten acid-rich feed is withdrawn at the same rate as the feed streams.

A preferred method for preparing the acid-rich feed is disclosed in U.S. Pat. No. 5,674,974, the disclosure of which is incorporated herein by reference, and in particular the continuous process for preparing an essentially anhydrous mixture of diacid and diamine disclosed in that document.

Diamine is fed into the reactor in the form of a liquid (preferably a diamine-rich liquid) or a vapour to at least one of the reaction stages below the first stage. Preferably, diamine is fed into the reactor at the final stage of the reactor and optionally one or more intermediate stage(s), preferably wherein said intermediate stage(s) are immediately above the final stage. Preferably, diamine is added as vapour. If fed as a liquid, diamine undergoes substantial vapourization when it comes into contact with the hot polymerizing mixture. Pre-vapourization of the diamine feed stream removes some of the heat requirement from the reactor and reduces the likelihood of temporal variation in the amount of diamine vapour flow at various points in the reactor. Typically, diamine is fed into the reactor at a flow rate of at least about 40 kg/hr, and up to about 10,000 Kg/hr in large reactors. As the skilled person will appreciate, the flow rate selected is dependent upon a number of factors, including the reactor size, the amounts of dicarboxylic acid or acid-rich mixture fed into the top of the reactor, the identities of the diacid and diamine, and the temperature of the melt, as discussed in more detail below.

An excess of free dicarboxylic acid over free amine is preferably maintained in the reactor during the process at each stage of the reactor. The amount of the excess (i.e. the ratio of free dicarboxylic acid to free amine) decreases down successive steps of the reactor as dicarboxylic acid in the feed-stream to the top of the reactor reacts with diamine fed into the bottom of the reactor.

The absorption of diamine into a reactive polyamide liquid is most rapid and complete when the liquid is highly acid-rich and at a relatively low temperature. The rate of transfer of diamine from vapor into liquid is sufficiently rapid and complete, even when the liquid is close to a balance of acid and amine ends, and at a high enough temperature to keep high molecular weight polymer molten, so that a reactor with six to eight stages is capable of producing balanced polymer and at the same time of retaining in the polymer essentially all of the diamine fed into the reactor.

The balance of acid and amine functional reactive groups (ends) is suitably monitored and controlled by an appropriate controlling system. Preferably, the balance is monitored by near-infrared spectrophotometry in the manner described in U.S. Pat. No. 5,674,974 which is incorporated herein by reference.

Holding time in the reactor is typically in the range from about one hour to about three hours.

In the vertical multistage reactors with which this invention is concerned, a liquid phase material P comprising polyamide accumulates at the bottom of the column, i.e. at and/or below the final stage, and the polyamide reaction product is then collected from this liquid phase material P.

Optionally, a gaseous stream C comprising steam and/or at least one inert gas is injected into the reactor and through the liquid phase material P in order to sparge said liquid phase material P, thereby attaining agitation thereof. The sparging-induced agitation prevents stagnation, which can cause degradation and/or the formation of gels and/or coloured impurities, which detracts from the quality of the polyamide product. Stream C agitates the mixture and drives turbulence to attain sufficient mixing and reduce or eliminate the need for direct agitation. The amount of gas injected is at least about 5 kg/hr per million grams of polyamide produced per hour, preferably at least about 8, and typically no more than about 25, more typically no more than about 20. In conventional processes, and in the absence of sparging, the natural vapour flow rate in the bottom stages of a column reactor is several times lower than in the top stages. Augmenting with additional amounts of an inert gas or vapour also improves column balance and heat transfer.

The stream C may comprise, consist of, or consist essentially of steam. The stream may comprise, consist of, or consist essentially of an inert gas. The stream may comprise, consist of, or consist essentially of a mixture of steam and at least one inert gas. The inert gas is suitably selected from the group consisting of $N_2$ and Ar, although other inert gases known to those skilled in the art may be used. The flow rate of the gaseous stream C may be controlled to give the required degree of agitation, and will depend upon a number of factors, including reactor size, the identity of the reactants and the other process conditions. The flow rate of stream C is suitably modulated in order to control within appropriate or pre-determined levels the total amount of water which exits as vapour/steam at the top of the reactor, bearing in mind that water is also a product of the polyamidation reaction.

The gaseous stream C may also have the effect of sparging liquid phase material accumulating at other stages in the reactor, i.e. at stages below the first stage and above the final stage, in order to agitate and attain sufficient mixing in these stages also. This effect is typically more significant for the lower stages closest to the bottom of the reactor and less significant for the upper stages closest to the top of the reactor.

Gaseous stream C is preferably injected into the reactor via one or more inlets from a pressurized gaseous chamber, or plenum. The plenum is preferably located at or below the final stage, i.e. the column bottom.

The temperature of the first stage and any other further stages should be sufficiently high to prevent solid forming in the reactor. Preferably, the temperature of the first stage and subsequent stages is at least about 125° C., preferably at least about 140° C., and may be at least about 160° C. or at least about 160° C., and preferably no more than about 180° C. Preferably, the temperatures of the second and subsequent stages of the reactor are greater than that of the first stage, such that the temperature of the reaction fluid is increased gradually as it passes from stage to stage down the column reactor. Preferably the temperature of the second and any subsequent stages is at least about 210° C., preferably at least about 215° C. Preferably the temperature of the second stage is no more than about 230° C., preferably no more than about 225° C. Preferably, the temperature in the final stage is at least about 260° C., and may be at least about 270° C., and preferably no more than about 280° C. Such temperature ranges are particularly suitable for the production of nylon 6,6, and may be modified as appropriate for other polyamides.

As described hereinabove, one of the means to control viscosity according to the present invention is to vary the pressure in the reactor. Preferably, however, the reactor is operated under atmospheric pressure or below atmospheric pressure, and is preferably operated under atmospheric pressure. By "operated under atmospheric pressure" is meant that the material pooling at the first stage of the column reactor (i.e. the furthest stage from the bottom of the column) is venting at atmospheric pressure. The pressure is measured in the vent line located at the top of the reactor where gaseous material is vented from the reactor. As the skilled person will nevertheless appreciate, the pressure will be greater at the bottom of the column because of the weight of the liquid above.

Preferably, the viscosity of the liquid phase material P is maintained at a value of no more than about 1200 poise, preferably no more than about 500 poise, and preferably in the range of from about 0.1 to about 200 poise.

Viscosity may be controlled by directly controlling the chemical equilibrium of the polyamidation reaction in the reactor. In particular, the limit of viscosity may be controlled by limiting the chemical equilibrium of the polyamidation reaction in any specific stage of the reactor by altering the composition of that stage. As used herein, the term "controlling the chemical equilibrium" means controlling the relative rates of the forward and reverse reactions of the equilibrium.

In a preferred embodiment, viscosity is controlled by injecting a stream comprising steam into at least one of the stages below said first reaction stage of the vertical multistage reactor. The stream comprising steam may be said stream C, or may alternatively be a stream D which is injected into at least one of the stages below said first reaction stage of said vertical multistage reactor. Stream D may be injected into the reactor to sparge said liquid phase material P. Preferably, stream D further comprises at least one inert gas, suitably selected from the group consisting of $N_2$ and Ar, although any inert gas known to those skilled in the art may be used as appropriate. The flow rate of the stream D will depend upon, inter alia, reactor size, the identity of the reactants and other process conditions, and is suitably modulated in order to control within appropriate or pre-determined levels the total amount of water which exits as vapour/steam at the top of the reactor, bearing in mind that water is also a product of the polyamidation reaction. In the polyamidation reaction of the process of the invention, the introduction of steam forces the equilibrium in the direction of the reactants, and this occurs where conditions are favourable for absorption of the steam into the melt (typically towards the upper stages of the reactor, rather than in the bottom stages of the reactor where the melt temperature may be too hot for absorption to occur). It will further be appreciated that increasing the moisture content (humidity) above the melt in the reactor in accordance with the present invention reduces the rate at which water vapour escapes from the melt, thereby impeding the rate of the polyamidation. Thus, the chemical equilibrium can be controlled through the moisture concentration of the melt by the introduction of steam into the reactor. Thus, the introduction of steam into the reactor in this way provides control over the viscosity of the liquid phase material in the reactor and over the viscosity of the liquid phase material P which is ultimately produced by the column reactor.

Alternatively or additionally, viscosity is controlled by maintaining the pressure of the reactor at a pressure greater than atmospheric pressure, preferably at least about 1.5 atm, preferably at least about 2 atm, preferably at least about 5 atm, and preferably no more than about 20 atm, preferably no more than about 17 atm, and preferably no more than about 12 atm. In the polyamidation reaction described herein, increasing the pressure forces the equilibrium in the direction of the reactants, at least in a closed reactor. Thus, the chemical equilibrium can be controlled through the moisture concentration of the melt by controlling the pressure in the reactor. Again, it will be appreciated that increasing the moisture content (humidity) above the melt in the reactor in accordance with the present invention reduces the rate at which water vapour escapes from the melt, thereby impeding the rate of the polyamidation. Thus, controlling the pressure in the reactor provides control over the viscosity of the liquid phase material in the reactor and over the viscosity of the liquid phase material P which is ultimately produced by the column reactor. Conventional co-current reactors require pressurised reactors (normally above about 13 atm) in order to preclude precipitation or crystallisation of salt in the reactor, i.e. by controlling temperature and pressure during the reaction the conventional co-current reactors utilise moisture in the molten reaction fluid to solvate the salt and the polymer of the balanced feeds. In the counter-current process of the present invention, solvation is not required, and pressurisation of the column reactor is effected not for the purpose of solvation but in order to control the chemical equilibrium.

Directly controlling the chemical equilibrium of the polyamidation reaction either by the introduction of steam or by the pressurisation of the reactor, as described above, determines the moisture concentration of the melt. Preferably, the moisture concentration of the melt (i.e. the liquid reaction material in the reactor) is maintained at a level such that the moisture concentration of the liquid phase material P is greater than about 0.1 wt %, preferably at least about 0.2 wt %, preferably at least about 0.3 wt %, and preferably no more than about 3.0 wt %. In conventional processes, as the temperature increases down the column reactor, the moisture concentration in the liquid melt decreases, thereby encouraging viscosity rise which would otherwise be controlled and limited only by residence time in the column, hence the requirement for mechanical agitation to prevent gelation in stagnant sections of the column. In the present invention, controlling moisture concentration by controlling the chemical equilibrium via steam introduction or pressurisation enables the process to reduce or eliminate the need for the mechanical agitation of conventional processes.

Alternatively or additionally, the viscosity of the liquid phase material P is controlled by controlling stream B so that the amounts of diamine and dicarboxylic acid introduced into the reactor during the process are stoichiometrically imbalanced. In particular, an excess of dicarboxylic acid over diamine is introduced into the reactor during the process. Thus, the column reactor is starved of diamine. Viscosity rise in the reactor results from increasingly greater amounts of polyamide product and an increasingly higher degree of polymerization of that product as the reaction progresses from the top stage to the bottom stage, and viscosity rise also results from the evaporation of the water produced by that polyamidation reaction. According to this aspect of the invention, the final viscosity of liquid phase material P can be controlled within pre-determined and desirable limits by controlling the amount of diamine introduced into the reactor. Thus, the polyamide product of liquid phase material P is itself stoichiometrically imbalanced, and comprises an excess of acid end-groups over amine end-groups. As used herein, the term "stoichiometrically imbalanced" defines the molar ratio of [moles dicarboxylic acid units]:[moles of diamine units] wherein the molar ratio is different from 1.0, and preferably greater than 1.0. A stoichiometrically imbalanced polyamide comprises an excess of acid end-groups over amine end-groups or vice versa, and preferably comprises an excess of acid end-groups over amine end-groups. Preferably, such stoichiometric imbalance in the liquid phase material P is such that this molar ratio is no more than 1.3:1, preferably no more than 1.1:1, and preferably no more than 1.05:1, and preferably at least 1.005:1.

The vertical multistage reactor is equipped with internal features suitable for effecting contact of counter-currently flowing diamine with the molten dicarboxylic acid or acid-rich feed stream so as to achieve rapid, efficient scrubbing of the diamine from the counter-currently flowing vapour. Such internal features are preferably present in each stage of the reactor.

Suitable internal features are suitably selected from perforated plates and coils to allow counter-current flow of diamine vapour and steam and/or inert gas from their entry points at the bottom of the column reactor and/or the lower stage(s) thereof towards the first and/or upper stage(s) of the reactor. Perforations are of sufficiently small diameter to allow passage of vapour in counter-current flow but without allowing passage of the liquid phase reaction fluid in the co-current direction of flow. Perforations may be present in a plate and/or a coil.

In a preferred embodiment, each stage comprises a substantially horizontal plate, one or more substantially vertical channel(s) and one or more weir(s), to effect contact between counter-currently flowing streams A and B. A vertical channel is also referred to herein as a "downcomer".

Liquid phase reaction fluid pools on the substantially horizontal plate until it reaches a level such that the reaction fluid flows over the weir(s) and down the substantially vertical channel(s), and then into the next stage. In such a state, the stage is referred to as being flooded. The amount of reaction fluid in each stage reaches a steady state during operation of the continuous process. In such a state the weirs are typically submerged in the reaction fluid. The fluid flows down said vertical channel(s) onto the substantially horizontal plate of the stage below. Preferably said one or more weir(s) is/are at the top of said vertical channel(s) and the fluid flows over the weir(s) directly into the channel(s). The height of a weir determines the degree to which it impedes the flow of liquid reaction fluid (referred to herein as "liquid hold-up"). The height of a weir is such that it attains optimal hold-up of the liquid phase reaction material, and suitable for the reactor size and the flow rate of the reaction material through the reactor. Thus, each stage is in fluid communication with an adjacent stage via said vertical channel(s), such that liquid phase reaction fluid flows from one stage to an adjacent stage down said vertical channel(s).

Each substantially horizontal plate comprises perforations which allow passage of gas, but not liquid phase reaction fluid. The perforations have a diameter appropriate for the nature and identity of the liquid phase reaction material, and the process conditions (including, inter alia, the flow rate of sparging gas and diamine). Thus, each stage is in further fluid communication with an adjacent stage via perforations, such that vapour flows counter-currently from one stage to an adjacent stage through the perforations. For example, diamine fed into the lower stages of the reactor passes upwardly through the perforations and is scrubbed by diacid in the liquid phase reaction material that is pooling on the horizontal plates. Gas that is injected to sparge the liquid phase reaction material at the bottom of the column may also pass through the apertures and sparge the liquid pooling on the plates in order to provide agitation of the liquid pooling on the plates and reduce or prevent gelation in stagnant zones.

A vertical channel may be defined by walls which extend downwardly to the upper surface of the horizontal plate of a subsequent stage, in which case perforations in a wall of the vertical channel allow reaction fluid to pass from the vertical channel onto the horizontal plate. Alternatively, a wall defining at least in part a vertical channel does not extend to the upper surface of the horizontal plate of a subsequent stage, allowing reaction fluid to pass through the gap between the bottom of a wall of the vertical channel and the horizontal plate of the subsequent stage In a preferred embodiment, and as illustrated in FIG. 2b, adjacent stages have two different and alternating configurations. In a first configuration, stage (n) comprises a horizontal plate extending inwardly from the walls of the reactor across the cross-section of the reactor column to define an opening and further comprises a downcomer located within said opening, wherein said opening is preferably substantially aligned with the centre of the plate. The top end of the downcomer extends above the plane of the horizontal plate to form the weir. Typically, the wall of the weir extends not only above the plane of the horizontal plate but also below the plane of the horizontal plate so that the downcomer is defined by an extended vertical channel. Liquid phase reaction fluid pools on the horizontal plate and flows over the top edges of the downcomer into the vertical channel defined thereby and then flows down onto the horizontal plate of the subsequent stage (n+1) below. In this first configuration of the stage (n), the flow of reaction fluid in the stage is inwardly from the walls of the reactor towards a central vertical channel. The subsequent stage (n+1) has a second configuration, in which the horizontal plate extends outwardly from the central axis of the reactor across only part of the cross-section of the reactor column to define an annular opening between the horizontal plate and the walls of the reactor. A weir is disposed around the circumference of the plate. There is no cylindrical downcomer at the centre of the plate in this second configuration, and instead a vertical channel is provided by the cylindrical annulus defined by the wall of the reactor and the wall of the weir. Again, the wall of the weir extends not only above the plane of the horizontal plate but also below the plane of the horizontal plate to define an extended vertical cylindrical annular channel. Reaction fluid pools on the horizontal plate of said stage (n+1) until it flows over the weir and down the vertical cylindrical annular channel into next stage (n+2), which repeats the first configuration described above for the stage (n). The flow of reaction fluid in the second configuration of the stage (n+1) is thus outwardly from the centre of the reactor.

Figure 1:
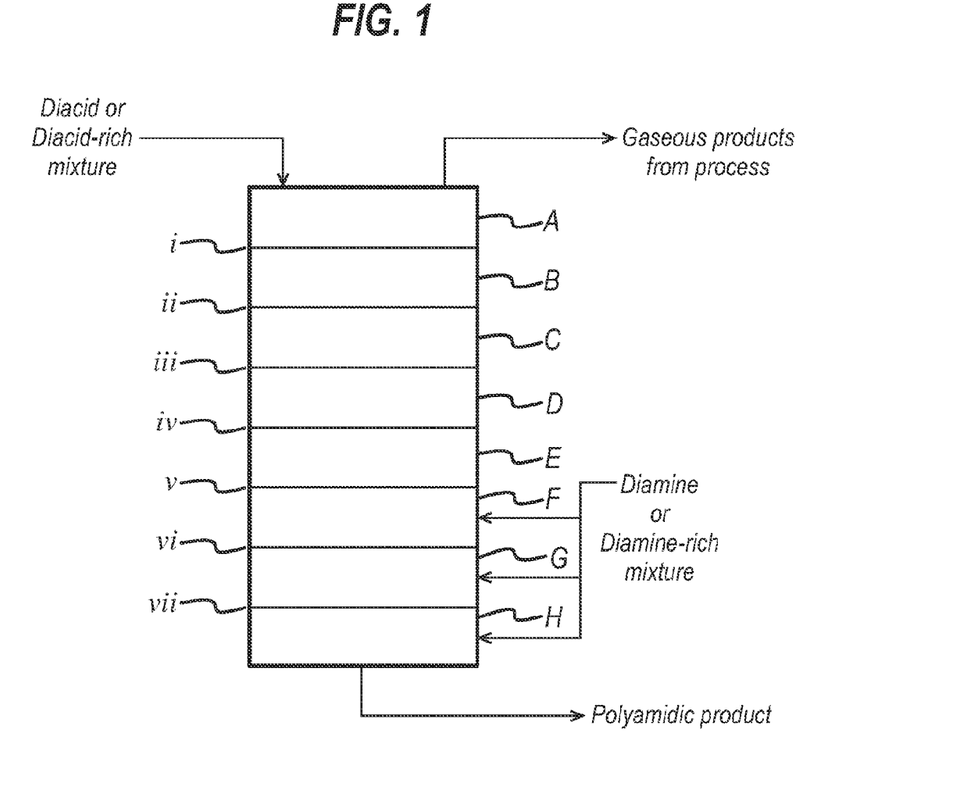
Figure 2A:
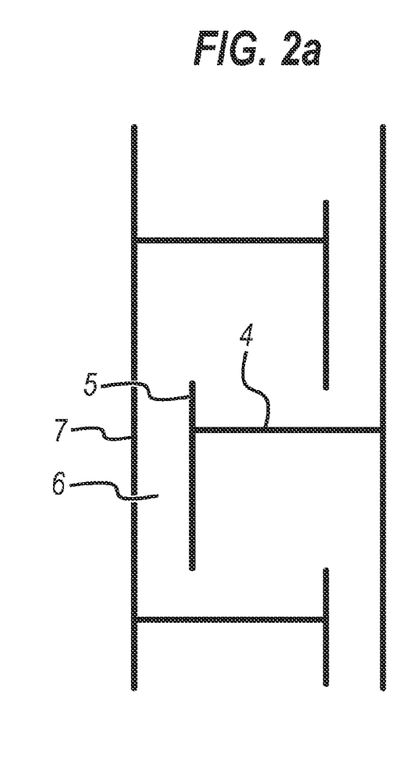
FIGS. 2a and 2b illustrate stage configurations that may be used in accordance with the present invention.
Figure 2B:
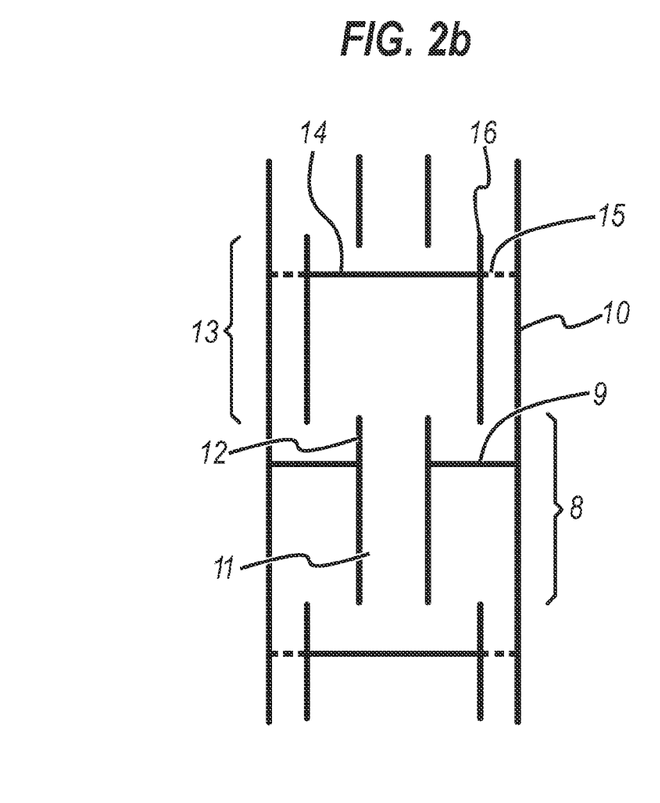
Figure 3A:
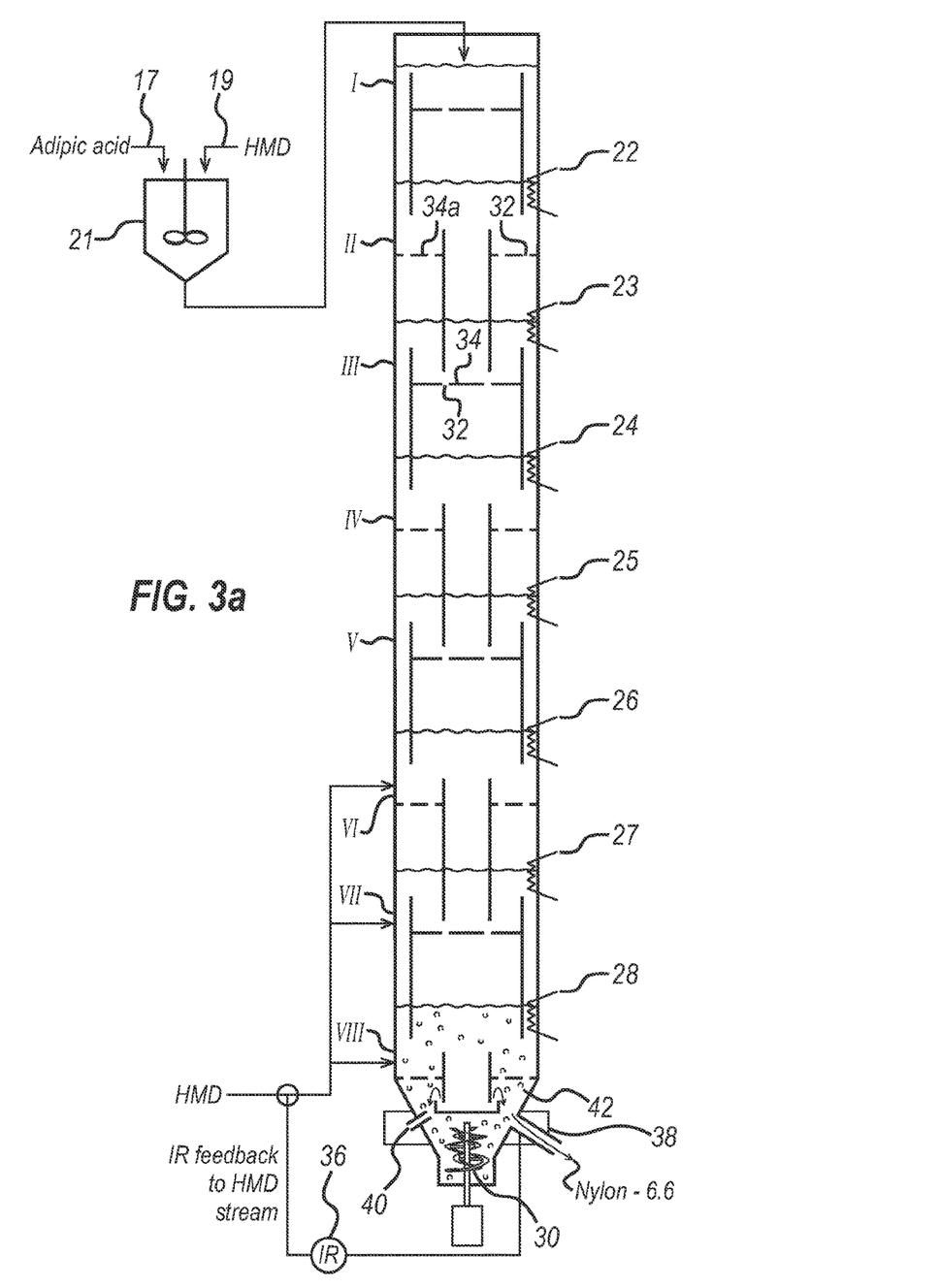
FIG. 3a is a cross section of an eight stage vertical multistage reactor according to the present invention in use with the stage configurations shown in FIG. 2b. The multistage reactor may also be used with the stage configurations shown in FIG. 2a, or any other suitable plate configuration.
Figure 3B:
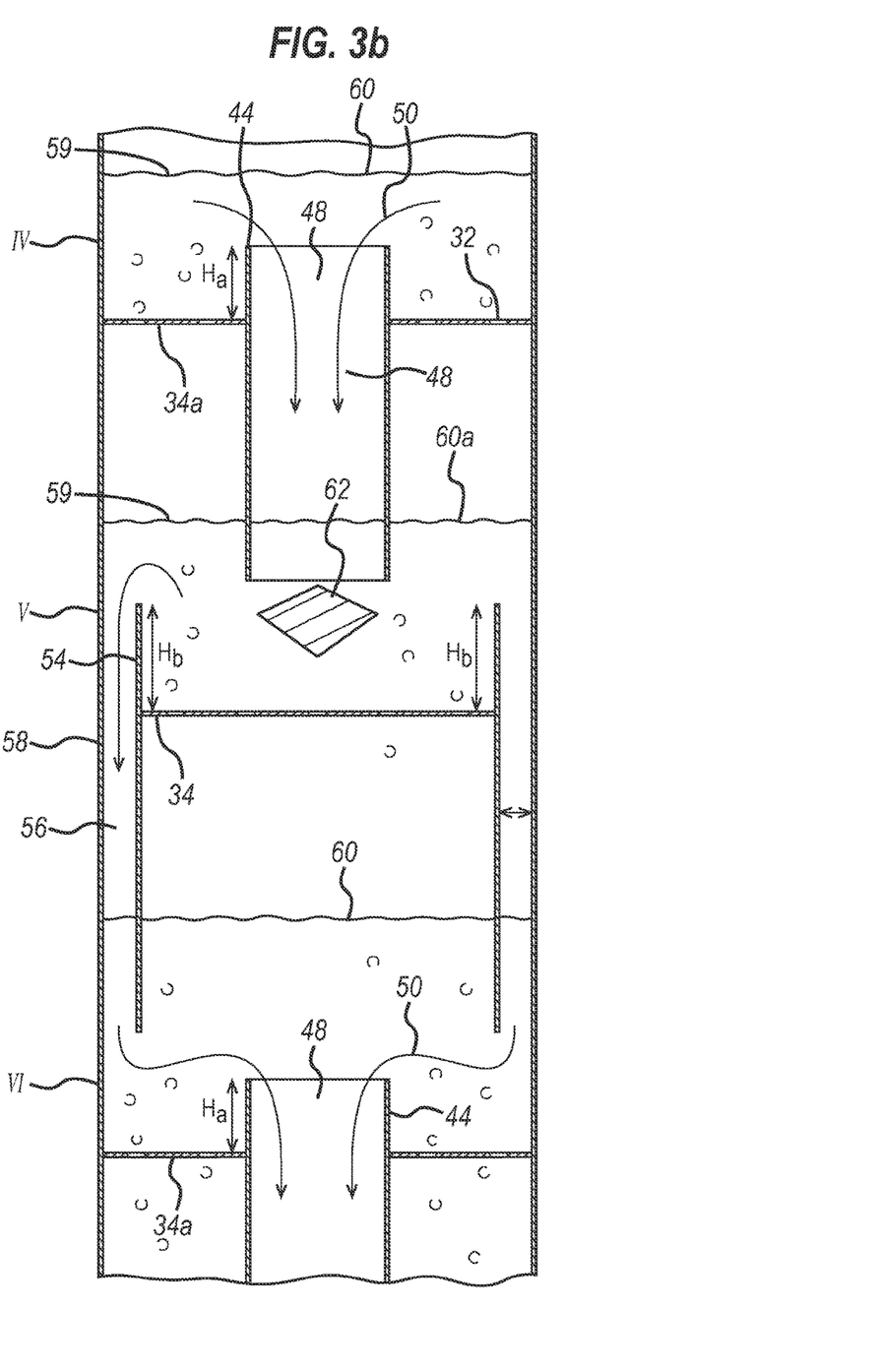
Figure 3C:
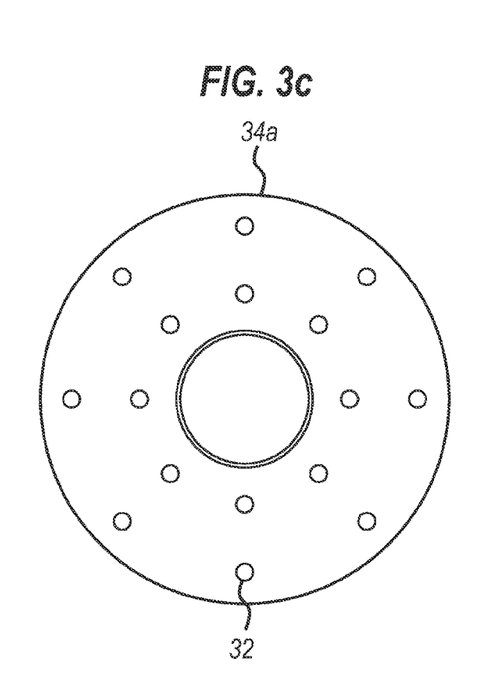
FIG. 3c is a plan view of horizontal plate (34a) shown in FIGS. 3a and 3b showing perforations (32).
Figure 3D:
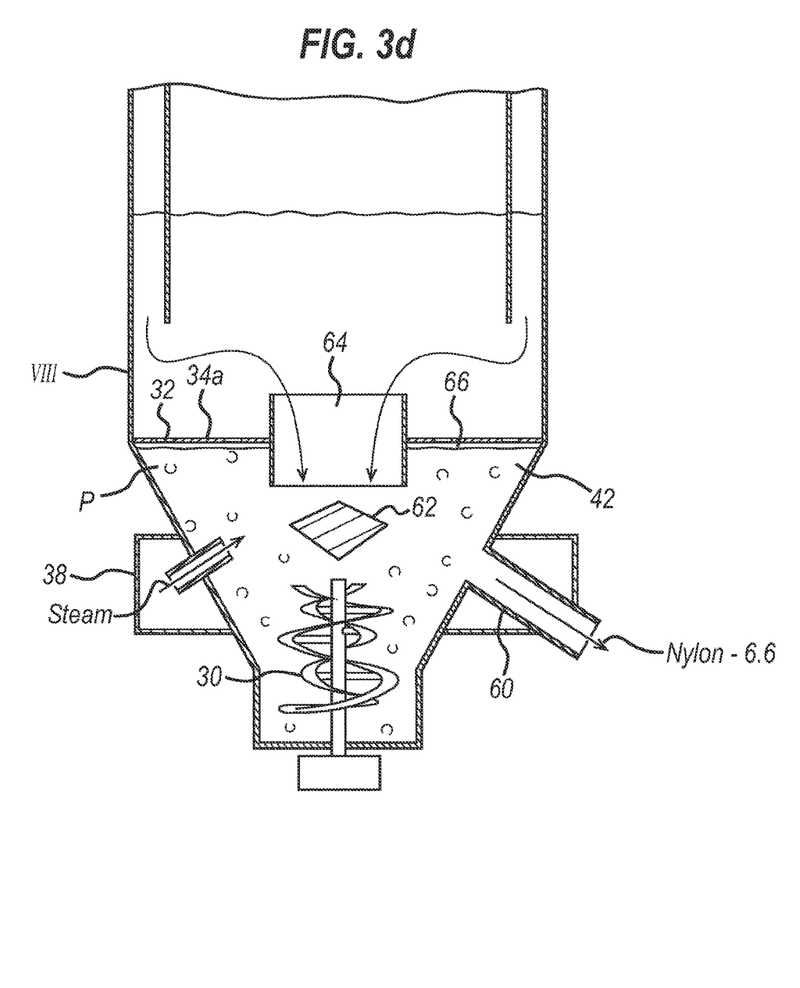
Figure 3E:
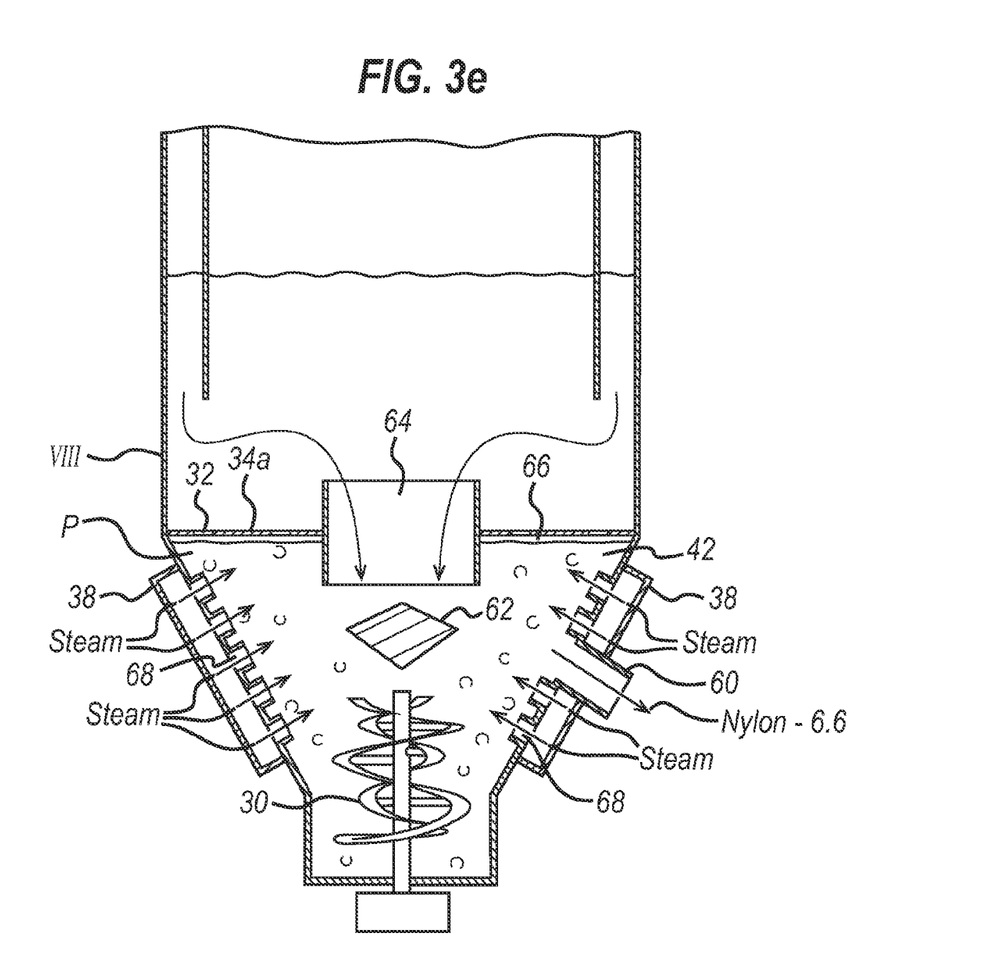
FIG. 3e illustrates a further design for the bottom of the column shown in FIG. 3a, wherein the plenum has an alternative configuration to the one shown in FIG. 3d. In particular, there are multiple entry points (68) form the plenum into the conical region (42).
Figure 3F:
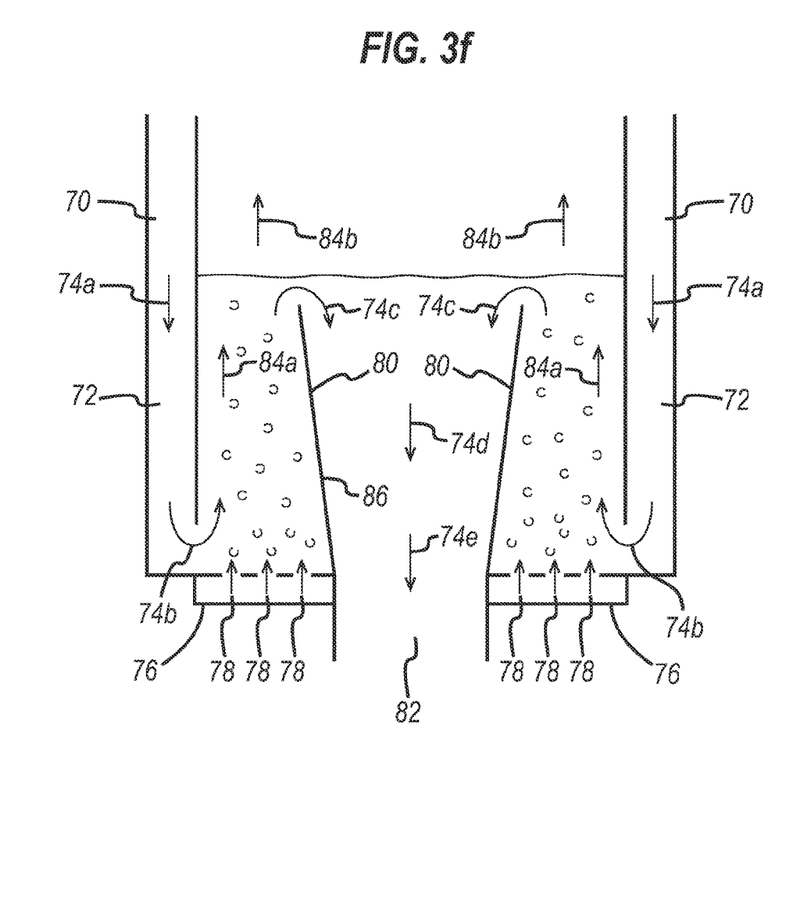
FIG. 3f illustrates a further design for the final stage and the bottom of the column, suitable for replacing stage VIII and the column bottom of the reactor in FIG. 3a. At this lowest stage, liquid reaction material (70) flows down annular channel (72) in the direction of arrows (74a) and (74b).
Figure 3G:
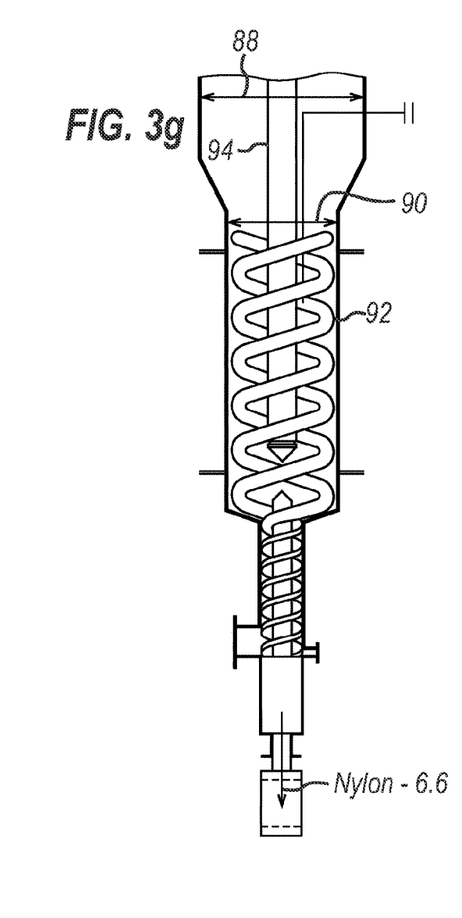
FIG. 3g illustrates a further design for the final stage and the bottom of the column, suitable for replacing stage VIII and the column bottom of the reactor in FIG. 3a. The diameter 88 of the stage is reduced gradually to a smaller diameter 90, i.e. it is "necked down". 94 is a downcomer from the stage above. The mechanical agitator 92 is only present in the part of smaller diameter 90. Therefore, in the case of large columns, agitators having a smaller diameter than that of the upper stages of the column can be used. The reduction in diameter of the lowest stage and the mechanical agitator is possible due to sparging and/or control of the viscosity of the liquid phase material P by the methods disclosed herein.

In a further preferred embodiment, and as illustrated in FIG. 2a, a stage comprises a horizontal plate which extends from a portion of the reactor wall across a portion of the cross-section of the reactor to define an opening bounded by a first arc defined by the boundary of the horizontal plate and a second arc defined by the internal surface of the wall of the reactor, preferably wherein the first and second arc are concentric. The area of a horizontal surface of said plate is thus reduced, relative to the cross-sectional area of the column reactor, by an arc-shaped opening along a portion of the circumference of the horizontal plate. The angles of the first and/or second arcs may be the same or different, and are preferably the same, and preferably said angles are no more than 180°. The width of the opening is preferably the same at all points around the arc, although tapered openings may also be used. At the boundary of the horizontal plate and the opening, there is disposed around the opening a weir extending above the plane of the horizontal plate, and preferably the walls of the weir also extend below the plane of the horizontal plate, thereby defining a vertical channel provided by an arc of the cylindrical annulus defined by the wall of the reactor and the walls of the weir. Liquid phase reaction fluid pools on the horizontal plate and flows over the top edges of the weir into the vertical channel and then flows down onto the horizontal plate of the subsequent stage immediately below. The subsequent stage is suitably disposed in the reactor such that its arc-shaped opening is on the opposite side of the reactor (i.e. diametrically opposed) to the arc-shaped opening of the immediately preceding stage.

The vertical channel comprises an opening (i.e. the diameter of a cylindrical pipe or the width of an annular channel) which has a size determined by, inter alia, the reactor size, the composition of the reaction material and the process conditions. As noted herein, one of the objects of the present invention is increased reactor size and output.

A stage may optionally comprise means to prevent or reduce entry of vapour into said vertical channel(s), which might otherwise disrupt the down-flow of the liquid phase reaction fluid through the channel. Suitable means comprises, for instance, a plate disposed substantially perpendicularly to the axis of the vertical channel and below the lower opening of said channel. Such means are referred to herein as vapour deflectors. A vapour deflector may be used, for instance, in a stage configured according to the first or second configuration described above, and finds particular utility in the first configuration.

It will be understood by the skilled person that the internal features are attached to the reactor walls via appropriate mechanical fixings.

Advantageously, the process of the present invention can be used to eliminate the need for mechanical agitation at or below the final stage of the vertical column reactor.

However, the present invention can advantageously also be used in combination with mechanical agitation, and in particular in combination with a mechanical agitator having a size much smaller than would otherwise be required, for a given size of reactor, than in conventional processes. As such, the prior art limitations on reactor size and output are obviated. Equally, the present invention obviates the need for increasingly larger agitators having the required combination of surface properties and sufficient mechanical strength which would be needed for increased reactor size and output, and such larger agitators would be enormously expensive and unreliable, even if they could be fabricated in the first place. The process according to the present invention instead allows a mechanical agitator of much smaller size to be used in the reactor.

Thus, the present invention allows larger reactors to be built which in turn have larger polyamide output.

Thus, in one embodiment, the process of the present invention further comprises the step of mechanical agitation of the liquid phase material P at or below the final stage of the reactor. Suitably, any mechanical agitator is located in a conical region below the final stage and at the bottom of the reactor, as is conventional in the art.

The process herein can be used to produce a wide variety of polyamides, particularly dimonomeric polyamides, as well as copolyamides, depending on the choice of diacids and diamines. The term "dimonomeric polyamide" as used herein refers to a polyamide prepared by the condensation polymerization of only two monomers, a diacid and a diamine, The diamine can be selected from the group consisting of ethanoldiamine, trimethylenediamine, putrescine, cadaverine, hexamethyelenediamine (HMD), 2-methyl pentamethylenediamine, heptamethylenediamine, 2-methyl hexamethylenediamine, 3-methyl hexamethylenediamine, 2,2-di methyl pentamethylenediamine, octamethylenediamine, 2,5-dimethyl hexamethylenediamine, nonamethylenediamine, 2,2,4- and 2,4,4-trimethyl hexamethylenediamines, decamethylenediamine, 5-methylnonanediamine, isophoronediamine, undecamethylenediamine, dodecamethylenediamine, 2,2,7,7-tetramethyl octamethylene diamine, meta-xylylene diamine, paraxylylene diamine, bis(p-aminocyclohexyl)methane, bis(aminomethyl)norbornane, any $C_2$-$C_{16}$ aliphatic diamine optionally substituted with one or more $C_1$ to $C_4$ alkyl groups, aliphatic polyether diamines and furanic diamines such as 2,5-bis(aminomethyl)furan.

The dicarboxylic acid can be selected from the group consisting of oxalic acid, malonic acid, succinic acid, glutaric acid, pimelic acid, adipic acid, suberic acid, azelaic acid, sebacic acid, undecanedioic acid, dodecandioic acid, maleic acid, glutaconic acid, traumatic acid, and muconic acid, 1,2- or 1,3-cyclohexande dicarboxylic acids, 1,2- or 1,3-phenylenediacetic acids, 1,2- or 1,3-cyclohexane diacetic acids, isophthalic acid, terephthalic acid, 4,4'-oxybisbenzoic acid, 4,4-benzophenone dicarboxylic acid, 2,6-napthalene dicarboxylic acid, p-t-butyl isophthalic acid and 2,5-furandicarboxylic acid.

In a preferred embodiment, the dicarboxylic acid is adipic acid and the diamine is hexamethylene diamine. Preferably, the process of the present invention is a process for the production of nylon-6,6.

An optional third starting material, having a carboxylic acid functional group and an amino functional group or a functional precursor to such a compound, may also be used, and such materials are suitably selected from 6-aminohexanoic acid, caprolactam, 5-aminopentanoic acid, 7-aminoheptanoic acid and the like.

In addition to dimonomeric polyamides based solely on diacid and diamines, it is sometimes advantageous to incorporate other reactants. When added at proportions less than 20% by weight, these may be added into the dicarboxylic acid or acid-rich mixture at some point prior to introduction into the reactor. Such reactants may include monofunctional carboxylic acids such as formic acid, acetic acid, propionic acid, butyric acid, valeric acid, benzoic acid, caproic acid, enanthic acid, octanoic acid, pelargonic acid, capric acid, undecanoic acid, lauric acid, myristic acid, myristoleic acid, palmitic acid, palmitoleic acid, sapienic acid, stearic acid, oleic acid, elaidic acid, vaccenic acid, linoleic acid, erucic acid and the like. These may also include lactams such as α-acetolactam, α-propiolactam, δ-propiolactam, γ-butyrolactam, δ-valerolactam, γ-valerolactam, caprolactam and the like. These may also include lactones such as α-acetolactone, α-propiolactone, β-propiolactone, γ-butyrolactone, δ-valerolactone, γ-valerolactone, caprolactone, and such like. These may include difunctional alcohols such as monoethylene glycol, diethylene glycol, 1,2-propanediol, 1,3-propanediol, dipropylene glycol, 1,2-butanediol, 1,3-butanediol, 1,4-butanediol, 2,3-butanediol, 1,2-pentanediol, 1,5-pentanediol, etohexadiol, p-menthane-3,8-diol, 2-methyle-2,4-pentanediol, 1,6-hexanediol, 1,7-heptanediol, and 1,8-octanediol. Higher functionality molecules such as glycerin, trimethylolpropane, triethanolamine and the like may also be useful. Suitable hydroxylamines may also be selected such as ethanolamine, diethanolamine, 3-amino-1-propanol, 1-amino-2-propanol, 4-amino-1-butanol, 3-amino-1-butanol, 2-Amino-1-butanol, 4-amino-2-butanol, pentanolamine, hexanaolamine, and the like. It will be understood that blends of any of these reactants may also be utilized without departing from this invention.

It may also be advantageous to incorporate other additives into the dicarboxylic acid or acid-rich mixture at some point prior to introduction into the reactor. These additives may include heat stabilizers such as copper salts, potassium iodide, or any of the other antioxidants known in the art. Such additives may also include polymerization catalysts such as metal oxides, acidic compounds, metal salts of oxygenated phosphorous compounds or others known in the art. Such additives may also be delustrants and colorants such as titanium dioxide, carbon black, or other pigments, dyes and colorants known in the art. Additives used may also include antifoam agents such as silica dispersions, silicone copolymers, or other antifoams known in the art. Lubricant aids such as zinc stearate, stearylerucamide, stearyl alcohol, aluminum distearate, ethylenebisstearamide or other polymer lubricants known in the art may be used. Nucleating agents may be included in the mixtures such as fumed silica or alumina, molybdenum disulfide, talc, graphite, calcium fluoride, salts of phenylphosphinate or other aids known in the art. Other common additives known in the art such as flame retardants, plasticizers, impact modifiers, and some types of fillers may also be added into the molten imbalanced mixtures prior to solidification. It will be understood that blends of any of these reactants may also be utilized without departing from the fundamentals of the embodiments disclosed herein.

It will be appreciated by the skilled person that the appropriate process conditions for performance of the invention will depend on the starting materials, i.e. the dicarboxylic acid and diamine. For instance, an appropriate initial melt temperature for the feed-stream A will depend on the identity of the dicarboxylic acid or acid-rich mixture. In addition, it is known in the prior art (see, for instance, U.S. Pat. No. 4,131,712) that the initial melt-temperature (i.e. the temperature of the melt of stream A fed into the top stage of the reactor) is suitably selected according to the diacid: diamine ratio of an acid-rich mixture. Thus, as the temperature of the melt at the top of the column is increased, an increasing proportion of the volatile diamine is released from the top of the column. As the temperature of the melt at the top of the column is decreased, the greater is the requirement for heat input from the downstream heaters in subsequent stages of the column.

Where the feed material is a dicarboxylic acid-rich mixture, the skilled person will appreciate that the diacid: diamine ratio and the reaction temperature and pressure are inter-dependent. Thus, as the diacid:diamine ratio is decreased, the temperature at the top of the column must be correspondingly increased to achieve a molten reaction material with a useful viscosity, but as the temperature is increased, then increasing amounts of diamine are released from the top of the reactor by evaporation, and there is also an increasing likelihood of thermal degradation of the reactants and reaction product. As noted above, the reactor is preferably operated at atmospheric pressure, and the diacid: diamine ratio is therefore selected accordingly. In an alternative embodiment, the reactor may be a pressurised reactor, in which case lower diacid:diamine ratios may be used. Appropriate diacid:diamine ratios will therefore be apparent to the skilled person, and will vary according to the identity of the diacid and the diamine. For instance, where the diacid is adipic acid (AA) and the diamine is hexamethylene diamine (HMD), the feed material is preferably selected such that the diacid:diamine ratio is greater than 0.6:0.4 for a reactor operated under atmospheric pressure. At AA:HMD ratios as low as 0.6:0.4, the melt temperature would have to be increased to an extent that would result in undesirable evaporation of HMD from the reactor, and in that instance a pressurised reactor would be appropriate.

The feed rate of the material introduced at the top of the reactor, and where appropriate the selection of the diacid: diamine ratio in this material, determines the flow rate of the diamine reactant introduced into the lower stages of the reactor, in order to obtain stoichiometric balance (or, where appropriate according to this invention, the desired imbalance) of the acid and amine components in the polyamide product P withdrawn at the bottom of reactor. The process conditions may optionally be selected such that the polyamide product P comprises a slight excess of acid. The appropriate diamine flow rate is therefore easily calculable by the person skilled in the art. In practice, the feed rates of diacid-containing material and diamine introduced into the column are calculated by the desired output of polyamide product P from the reactor, which in turn will vary according to the size of the reactor.

As the polyamidation reaction progresses, the diamine: diacid ratio changes in successive stages down the column, and may be measured via the parameter of "difference in end-groups" (DE), i.e. DE=[amount of acid ends]−[amount of amine ends]. As the reaction material approaches the bottom of the reactor, the material approaches stoichiometric balance. In a preferred embodiment, the polyamide material P leaving the reactor comprises a slight excess of acid, which is then neutralised after polyamide P has exited the reactor by a "trim feed" of diamine, the amount of diamine required in the trim feed preferably being calculated based on near infra-red (NIR) spectroscopic measurements of the composition of the polyamide P leaving the reactor, as disclosed in U.S. Pat. No. 5,674,974. Preferably, the specification of the polyamide product P is such that DE is ±150 meq/kg, preferably ±100 meq/kg, typically from ±10 to 50 meq/kg, particularly wherein there is an excess of acid end-groups over amine end-groups. Preferably, the amount of diamine in the trim feed is calculated in order to obtain stoichiometric balance, but the balance may be varied depending on the desired specification of the polyamide product.

BRIEF DESCRIPTION OF THE DRAWINGS

FIG. 1 describes diagrammatically the internal configuration of a conventional polyamidation reactor. The reactor is divided into discrete stages A to H using perforated barriers, (i) to (vii), between stages, which barriers allow separate passages for vapour and liquid flows from stage to stage.

In FIG. 2a, each stage comprises a substantially horizontal plate (4), a weir (5) and channel (6) defined in part by the wall (7) of the reactor. In FIG. 2b, alternate stages comprise a first configuration (8) comprising a substantially horizontal plate (9) that extends inwardly from the wall (10) of the reactor with a centrally aligned cylindrical downcomer (11), the top of the downcomer providing the weirs (12). Alternate stages in FIG. 2b comprise a second configuration (13) comprising a substantially horizontal plate (14) extending outwardly from the central axis of the reactor and a vertical channel (15) formed between weirs (16) and the wall (10) of the reactor.

In FIG. 3a, feed material streams (17) and (19) are fed into mix tank (21) for diacid-rich feed preparation. The acid-rich feed is then fed into stage I at the top of the reactor. The column is heated by heat sources (22) to (28). Agitator (30) is located at the bottom of the reactor. Hexamethylene diamine vapour is fed into the reactor at various stages VI, VII and VIII. Nylon-6.6 polymer is removed after bottom stage VIII. Each stage comprises plates (34 or 34a) comprising perforations (32) which allow flow of vapour but not liquid. The reaction liquid flows through each stage as shown in FIG. 3b, described in further detail below.

Hexamethylene diamine is supplied as vapour continuously into the upper part of each of the three stages (VI, VII and VIII) above the bottom stage. This vapour and any additional vapour of diamine or steam formed within the reactor flows from each stage to the stage above through perforations (32) in substantially horizontal plates (34 or 34a), thus bringing vapour into intimate contact with the liquid in the stage above. The balance in the liquid phase material P is monitored by IR spectrometer (36) and the amount of hexamethylene diamine fed into the reactor is adjusted accordingly. Vapour flowing through the top stage is continuously removed from the top of the reactor.

Plenum (38) provides pressurised steam that is injected into the reactor through one or more inlets (40) to contact the liquid accumulating at the bottom stage of the column in conical region (42), enabling sparging of the liquid and reduced mechanical agitation. The flow rate of the steam may be varied in order to control the moisture level of the liquid so that the viscosity of the liquid may be modulated. The combination of agitation and viscosity control provided by the steam reduces the need for mechanical agitation. Sparging gas bubbles out of the liquid at the bottom of the column and up through perforations (32) in the stages thereabove, thereby also sparging the liquid pooling present in these stages and preventing gelation in the stagnant areas, although this effect is typically significant only in the lower stages rather than the higher stages. Steam flowing through the top stage is continuously removed from the top of the reactor with diamine and steam formed in the reactor.

FIG. 3b illustrates stages IV to VI in the column of FIG. 3a. In stages IV and VI, the liquid phase reaction fluid (60) pools on horizontal plate (34a) and flows in the direction (50) over weir (44) down cylindrical downcomer (48). In stage V, the liquid phase reaction fluid pools on horizontal plate (34) and flows over weir (54) down annular channel (56) between weir (54) and the wall (58) of the reactor. In a continuous process, the levels (59) of liquid phase reaction fluid are held above the height of the weir such that the stage is flooded. The heights ($H_a$ and $H_b$) of weir (44) and weir (54) control the hold-up of liquid phase material in the reactor. Vapour deflector (62) prevents gas from flowing up through the channel (48) and disrupting liquid flow.

FIG. 3d illustrates the bottom of the column shown in FIG. 3a. Liquid phase material P rich in high molecular weight polyamide accumulates in conical region (42) and is extracted from the reactor through outlet (60). Steam is injected from plenum (38) into the conical region to supplement the agitation provided by mechanical agitator (30). Vapour deflector plate (62) is located beneath channel (64) to prevent gas from flowing up through the channel (64) and disrupting liquid flow. A pocket of sparging gas (66) typically forms beneath perforated plate (34a), which then passes through perforations (32) towards the upper stages.

A gaseous stream is injected into the bottom of the reactor from plenum (76) through one or more inlets (78), and this may be gaseous stream C or D (preferably pressurised steam). Inlets (78) may also be used to introduce diamine into the reactor at this point, optionally in combination with additional diamine inlets in higher stages (not shown) of the reactor as described hereinabove. Inlets (78) may provide a combination of diamine vapour and gaseous stream C and/or D or pure diamine vapour or pure gaseous stream C and/or D. The liquid phase material P flows over weir (80) and down channel (82) in the direction of arrows (74c), (74d) and (74e). The gaseous component(s) introduced via inlets (78) pass up through the liquid phase material P in the direction of arrows (84a) and (84b), and then on to the preceding stage as described hereinabove. It will be appreciated that in this final stage only, there is co-current flow of diamine with the liquid reaction material at the bottom of the reactor. As the vapour travels in the direction of arrows (84b) and up through the preceding and higher stages of the reactor, the diamine stream travels counter-currently to the liquid/molten phase through the preceding and higher stages of the reactor. The inner cone or cylinder (86) formed by weirs (80) is optionally agitated by a mechanical agitator (not shown). Optionally, one or more apertures or gaps (not shown) are present at the base of the cone or cylinder (86) to allow a small amount of liquid drainage bypassing the weir (80) thus reducing any tendency towards long liquid residence times in that zone.

The invention is further illustrated by the following non-limiting illustrative examples for the production of nylon-6.6.

EXAMPLE 1

Adipic acid (AA) and hexamethylene diamine (HMD) are fed into a mixing tank at 162 lb/hr and 38 lb/hr, respectively. The heated mixture is fed into the top of an eight-stage reactor column at a rate of 199 lb/hr. Gaseous HMD is fed into the lowest three stages of the reactor at a rate of 90 lb/hr. During the reaction process, a stream C of steam is fed from a pressurised plenum at a rate of up to 20 lb/hr into a conical chamber below the lowest stage at the bottom of the reactor, the conical chamber being the region below the lowest stage in which is accumulated liquid phase material P rich in high molecular weight polyamide. The reactor is not equipped with an agitator, but otherwise comprises the features described in FIGS. 3a to 3d.

During operation of the reactor according to the invention, gaseous steam exits from the top of the reactor at a rate of 40 lb/hr without additional steam from stream C, or 60 lb/hr with additional steam from stream C, wherein the vapour exiting the top of the reactor comprises less than 100 ppm HMD. The reaction conditions of the process, the viscosity, the difference in end-groups and the molar amount of HMD at each stage are shown in Table 1 below.

TABLE 1

| Stage | Temp. | Viscosity[a] | Difference in End-groups (meq/Kg) | HMD (mol %)[a] |
|---|---|---|---|---|
| 1 | 170° C. | 0.3 Poise | 9614 | 14.8 |
| 2 | 220° C. | 0.5 Poise | 9614 | 14.8 |
| 3 | 230° C. | 1 Poise | 8876 | 16.6 |
| 4 | 250° C. | 2 Poise | 6251 | 23.9 |
| 5 | 265° C. | 5 Poise | 2482 | 37.7 |
| 6 | 275° C. | 10 Poise | 892 | 45.2 |
| 7 | 275° C. | 20 P/10RV | 35 | 49.8 |
| 8 | 275° C. | 100 P/17RV | 35 | 49.8 |

[a]melt viscosity (in poise) unless otherwise stated, otherwise relative viscosity (RV)
b: on the basis of 100 mol of balanced polymer Polyamide material P is withdrawn at a rate of about 250 lb/hr as a stream from the lowest stage of the reactor, and the composition of that stream analysed by NIR spectroscopy. A trim feed of HMD at a rate of 0.7 lb/hr is introduced into the stream of polyamide material P on the basis of the NIR analysis, and the composition of the polyamide material P analysed immediately thereafter, providing a balanced polyamide material.

EXAMPLE 2

The reactor column of Example 1 is run again at a polyamide withdraw rate of 250 lb/hr but the pressure in the reactor column is varied. Pressure is measured in the vent where gaseous material exits the top of the reactor. The moisture content and viscosity of the liquid phase material P in the region below the lowest stage of the column varies as follows:

TABLE 2

| Pressure (bar) | Relative viscosity | Moisture (wt %) | Viscosity (Poise) | Difference in End-groups (meq/Kg) |
|---|---|---|---|---|
| 0.203 | 23.8 | 0.05 | 249 | 79.9 |
| 0.507 | 21.1 | 0.12 | 172 | 79.8 |
| 0.811 | 19.8 | 0.19 | 140 | 79.7 |
| 1.013 | 19.1 | 0.24 | 126 | 79.7 |
| 1.571 | 17.8 | 0.37 | 99 | 79.6 |
| 2.027 | 16.7 | 0.50 | 81 | 79.5 |
| 3.040 | 14.9 | 0.76 | 56 | 79.2 |
| 4.053 | 13.6 | 1.04 | 40 | 79.0 |
| 4.762 | 12.8 | 1.25 | 32 | 78.8 |

As can be seen in Table 2, increasing the pressure above 1 bar reduces the viscosity of the liquid phase material P. Thus, it is evident that in a column where mechanical agitation is required, the mechanical agitation requirement can be reduced by lowering the viscosity of the material P by increasing the pressure in the column reactor. In this particular column reactor, the user can attain optimal viscosity without the need for mechanical agitation at all.

EXAMPLE 3

The reactor column of Example 1 is run again at a polyamide withdraw rate of 250 lb/hr but the reactor balance in the column is varied. The moisture content and viscosity of the liquid phase material P in the region below the lowest stage of the column varies has follows:

TABLE 3

| Pressure (bar) | Relative viscosity | Moisture (wt %) | Viscosity (Poise) | Difference in End-groups (meq/Kg) |
|---|---|---|---|---|
| 1.013 | 19.1 | 0.24 | 126 | 79.7 |
| 1.013 | 17.3 | 0.24 | 91 | 149.5 (excess HMD) |
| 1.013 | 13.5 | 0.24 | 39 | 249.3 (excess HMD) |
| 1.013 | 17.6 | 0.24 | 97 | −99.4 (excess AA) |
| 1.013 | 14.6 | 0.24 | 52 | −248.8 (excess AA) |

As can be seen in Table 3, having a stoichiometric imbalance of AA and HMD (either excess AA or excess HMD) in the column reactor reduces the viscosity of the material P. Thus, it is evident that in a column where mechanical agitation is required, the mechanical agitation requirement can be reduced by maintaining and imbalance of AA and HMD in the column reactor. In this particular column reactor, the user can attain optimal viscosity without the need for mechanical agitation at all.

EXAMPLE 4

The reactor column of Example 1 is run again at a polyamide withdraw rate of 250 lb/hr but the amount of steam fed into the lowest three stages of the reactor is varied. The moisture content and viscosity of the liquid phase material P in the region below the lowest stage of the column varies has follows:

TABLE 4

| Steam input (Kg/hr) | Pressure (bar) | Relative viscosity | Moisture (wt %) | Viscosity (Poise) | Difference in End-groups (meq/Kg) |
|---|---|---|---|---|---|
| 0 | 1.013 | 16.1 | 0.25 | 72 | 79.2 |
| 1 | 1.013 | 15.4 | 0.25 | 62 | 79.2 |
| 5 | 1.013 | 14.3 | 0.25 | 48 | 79.3 |
| 10 | 1.013 | 14.2 | 0.25 | 47 | 79.4 |
| 15 | 1.013 | 14.4 | 0.25 | 49 | 79.4 |

As can be seen in Table 4, increasing the amount of steam fed into the lowest three stages of the reactor reduces the viscosity of the material P. Thus, it is evident that in a column where mechanical agitation is required, the mechanical agitation requirement can be reduced by increasing the flow of steam into the lowest three stages of the reactor. In this particular column reactor, the user can attain optimal viscosity without the need for mechanical agitation at all.

The invention claimed is:
1. A continuous process for the manufacture of a polyamide, the process comprising the steps of:
   (i) flowing a stream A comprising a molten dicarboxylic acid, or a molten dicarboxylic acid-rich mixture comprising a dicarboxylic acid and a diamine, through a first stage and at least one more reaction stage of a vertical multistage reactor, wherein the first stage is at the top of the reactor;
   (ii) counter-currently flowing a stream B comprising a diamine as a vapour or a diamine-rich liquid through at least one of the stages below the first reaction stage of said vertical multistage reactor;

(iii) accumulating a liquid phase material P comprising polyamide at and/or below the final stage of said reactor;

wherein said reactor is equipped with internal features suitable for effecting contact between counter-currently flowing streams A and B;

wherein the viscosity of said liquid phase material P is controlled by directly controlling the chemical equilibrium of the polyamidation reaction or by controlling stream B so that the amounts of diamine and dicarboxylic acid introduced into the reactor during the process are stoichiometrically imbalanced; and wherein the reactor is maintained at a pressure of about 1.5 atm to about 20 atm.

2. The process of claim 1, wherein said viscosity of the liquid phase material P is maintained at a value of about 0.1 poise to about 1200 poise.

3. The process of claim 1, wherein a gaseous stream C comprising steam, or at least one inert gas, or a mixture of steam and at least one inert gas, is injected into the reactor at or below the final stage of the reactor.

4. The process of claim 3, wherein gaseous stream C is injected into the reactor to sparge said liquid phase material P to attain agitation thereof.

5. The process of claim 3, wherein gaseous stream C consists or consists essentially of steam.

6. The process of claim 1, wherein viscosity is controlled by injecting a stream comprising steam into at least one of the stages below said first reaction stage of said vertical multistage reactor.

7. The process of claim 6, wherein the stream comprising steam is said stream C or a stream D.

8. The process of claim 7, wherein the stream D is injected into at least one of the stages below said first reaction stage of said vertical multistage reactor.

9. The process of claim 8, wherein said stream D is injected into the reactor to sparge said liquid phase material P.

10. The process of claim 7, wherein said stream D further comprises an inert gas.

11. The process of claim 1, wherein the reactor is operated under atmospheric pressure or below atmospheric pressure.

12. The process of claim 1, wherein viscosity is controlled by maintaining the pressure of the reactor at a pressure greater than atmospheric pressure.

13. The process of claim 1, wherein the moisture concentration of the liquid phase material P is maintained at a level of 0.1 wt % to about 3.0 wt %.

14. The process of claim 1, wherein viscosity is controlled by controlling stream B so that the diamine and dicarboxylic acid introduced into the reactor are stoichiometrically imbalanced.

15. The process of claim 14, wherein an excess of dicarboxylic acid over diamine is introduced into the reactor during the process, wherein the stoichiometric imbalance in the liquid phase material P is such that the molar ratio of [moles dicarboxylic acid units]:[moles of diamine units] is 1.005:1 to 1.3:1.

16. The process of claim 1, wherein the dicarboxylic acid comprises one or more di-acids chosen from oxalic acid, malonic acid, succinic acid, glutaric acid, pimelic acid, adipic acid, suberic acid, azelaic acid, sebacic acid, undecanedioic acid, dodecandioic acid, maleic acid, glutaconic acid, traumatic acid, and muconic acid, 1,2- or 1,3-cyclohexande dicarboxylic acids, 1,2- or 1,3-phenylenediacetic acids, 1.2- or 1,3-cyclohexane diacetic acids, isophthalic acid, terephthalic acid, 4,4'-oxybisbenzoic acid, 4,4-benzophenone dicarboxylic acid, 2,6-napthalene dicarboxylic acid, p-t-butyl isophthalic acid and 2,5-furandicarboxylic acid.

17. The process of claim 1, wherein the diamine is chosen from ethanoldiamine, trimethylenediamine, putrescine, cadaverine, hexamethyelenediamine, 2-methyl pentamethylenediamine, heptamethylenediamine, 2-methyl hexamethylenediamine, 3-methyl hexamethylenediamine, 2,2-dimethyl pentamethylenediamine, octamethylenediamine, 2,5-dimethyl hexamethylenediamine, nonamethylenediamine, 2,2,4- and 2,4,4-trimethyl hexamethylenediamines, decamethylenediamine, 5-methylnonanediamine, isophoronediamine, undecamethylenediamine, dodecamethylenediamine, 2,2,7,7-tetramethyl octamethylenediamine, meta-xylylene diamine, paraxylylene diamine, bis(p-aminocyclohexyl)methane, bix(aminomethyl)norbornane, any $C_2$-$C_{16}$ aliphatic diamine optionally substituted with one or more $C_1$ to $C_4$ alkyl groups, aliphatic polyether diamines and furanic diamines.

18. The process of claim 1, wherein the dicarboxylic acid is adipic acid and the diamine is hexamethylenediamine.

19. The process of claim 1, wherein the vertical multistage reactor has at least 6 and/or no more than 10 stages.

20. A continuous process for the manufacture of a polyamide, the process comprising the steps of:
(i) flowing a stream A comprising a molten dicarboxylic acid, or a molten dicarboxylic acid-rich mixture comprising a dicarboxylic acid and a diamine, through a first stage and at least one more reaction stage of a vertical multistage reactor, wherein the first stage is at the top of the reactor;
(ii) counter-currently flowing a stream B comprising a diamine as a vapour or a diamine-rich liquid through at least one of the stages below the first reaction stage of said vertical multistage reactor;
(iii) accumulating a liquid phase material P comprising polyamide at and/or below the final stage of said reactor;

wherein said reactor is equipped with internal features suitable for effecting contact between counter-currently flowing streams A and B;

wherein the viscosity of said liquid phase material P is controlled by directly controlling the chemical equilibrium of the polyamidation reaction or by controlling stream B so that the amounts of diamine and dicarboxylic acid introduced into the reactor during the process are stoichiometrically imbalanced; and wherein the moisture concentration of the liquid phase material P is maintained at a level of 0.1 wt % to about 3.0 wt %.

21. The process of claim 20, wherein an excess of dicarboxylic acid over diamine is introduced into the reactor during the process, wherein the stoichiometric imbalance in the liquid phase material P is such that the molar ratio of [moles dicarboxylic acid units]:[moles of diamine units] is 1.005:1 to 1.3:1.

* * * * *

UNITED STATES PATENT AND TRADEMARK OFFICE
CERTIFICATE OF CORRECTION

PATENT NO. : 9,834,643 B2
APPLICATION NO. : 15/037635
DATED : December 5, 2017
INVENTOR(S) : Marchildon et al.

Page 1 of 1

It is certified that error appears in the above-identified patent and that said Letters Patent is hereby corrected as shown below:

On the Title Page

In item (57), in "Abstract", in Column 2, Line 3, delete "moltendicarboxylic" and insert --molten dicarboxylic-- therefor In item (57), in "Abstract", in Column 2, Line 8, delete "vapor" and insert --vapour-- therefor In the Claims In Column 20, Line 4, in Claim 16, delete "1.2-" and insert --1,2--- therefor In Column 20, Line 21, in Claim 17, delete "bix(aminomethyl)norbornane" and insert --bis(aminomethyl)norbornane-- therefor Signed and Sealed this
Twenty-eighth Day of May, 2019

Andrei Iancu
*Director of the United States Patent and Trademark Office*